US010500900B2

(12) United States Patent
Sakamoto (10) Patent No.: US 10,500,900 B2
(45) Date of Patent: Dec. 10, 2019

(54) PNEUMATIC TIRE

(71) Applicant: TOYO TIRE & RUBBER CO., LTD., Osaka-shi, Osaka (JP)

(72) Inventor: Sachio Sakamoto, Osaka (JP)

(73) Assignee: TOYO TIRE CORPORATION, Itami-shi (JP)

( * ) Notice: Subject to any disclaimer, the term of this patent is extended or adjusted under 35 U.S.C. 154(b) by 199 days.

(21) Appl. No.: 15/497,545

(22) Filed: Apr. 26, 2017

(65) Prior Publication Data

US 2018/0065415 A1 Mar. 8, 2018

(30) Foreign Application Priority Data

Sep. 7, 2016 (JP) .................................. 2016-174695

(51) Int. Cl.
*B60C 11/01* (2006.01)
*B60C 13/02* (2006.01)
*B60C 13/00* (2006.01)
*B60C 11/03* (2006.01)

(52) U.S. Cl.
CPC .......... *B60C 11/01* (2013.01); *B60C 11/0306* (2013.01); *B60C 13/00* (2013.01); *B60C 13/002* (2013.01); *B60C 13/02* (2013.01); *B60C 2011/013* (2013.01); *B60C 2011/0358* (2013.01); *B60C 2200/14* (2013.01)

(58) Field of Classification Search
CPC ....... B60C 13/002; B60C 13/02; B60C 11/01; B60C 2011/013
USPC ............................ 152/209.16, 523; D12/605
See application file for complete search history.

(56) References Cited

U.S. PATENT DOCUMENTS

| 2,760,541 | A | * | 8/1956 | Reifenberger | ............ | B60C 3/04 |
| | | | | | | 152/153 |
| 2,972,368 | A | * | 2/1961 | Williams | ............ | B60C 11/0306 |
| | | | | | | 152/209.16 |
| 5,361,814 | A | * | 11/1994 | Covert | ................ | B60C 11/0306 |
| | | | | | | 152/209.16 |
| 5,571,351 | A | * | 11/1996 | Hatakenaka | ............ | B60C 11/01 |
| | | | | | | 152/209.16 |

(Continued)

FOREIGN PATENT DOCUMENTS

| JP | 53109306 | A | * | 9/1978 | ............. | B60C 11/01 |
| JP | 11291718 | A | * | 10/1999 | | |

(Continued)

OTHER PUBLICATIONS

Machine Translation: JP-11291718-A; Ono, Masaharu; (Year: 2019).*

(Continued)

*Primary Examiner* — Kendra Ly
(74) *Attorney, Agent, or Firm* — Westerman, Hattori, Daniels & Adrian, LLP (57) ABSTRACT

In a pneumatic tire, a sidewall portion includes a plurality of projecting portions projecting in a tire width-direction. The projecting portions are placed such that at least portions of the projecting portions are superposed on one of a plurality of blocks in a tire radial-direction as viewed from a tire width-direction. At least one of the plurality of projecting portions includes at least one opening. A total sum of an opening area of the opening is equal to or smaller than an actual area of the projecting portion in the at least one of the projecting portions.

19 Claims, 10 Drawing Sheets

(56) References Cited

U.S. PATENT DOCUMENTS

| | | | | |
|---|---|---|---|---|
| 6,530,405 B1 * | 3/2003 | Brown | ................... | B60C 11/01 |
| | | | | 152/209.16 |
| 6,533,007 B1 * | 3/2003 | McMannis | .............. | B60C 11/01 |
| | | | | 152/209.16 |
| 2010/0288409 A1 | 11/2010 | Ohara | | |
| 2016/0176239 A1 * | 6/2016 | Shima | ................... | B60C 13/02 |
| | | | | 152/523 |
| 2019/0016179 A1 * | 1/2019 | Yamakawa | ......... | B60C 11/1236 |

FOREIGN PATENT DOCUMENTS

| | | | | |
|---|---|---|---|---|
| JP | 2003112505 A | * | 4/2003 | |
| JP | 2010-264962 A | | 11/2010 | |
| JP | 2016074385 A | * | 5/2016 | |

OTHER PUBLICATIONS

Machine Translation: JP-2003112505-A; Tanaka, Masatoshi; (Year: 2019).*
Machine Translation: JP-53109306-A; Tanaka, Makoto; (Year: 2019).*
Machine Translation: JP-2016074385-A; Yaegashi Go; (Year: 2019).*

* cited by examiner

| | Example 1 | Example 2 | Example 3 | Example 4 | Example 5 | Comparative Example 1 | Comparative Example 2 |
|---|---|---|---|---|---|---|---|
| Total sum of the opening area A1 | 25 | 5 | 10 | 30 | 50 | 0 | 55 |
| Actual area of the projecting portion A2 | 75 | 95 | 90 | 70 | 50 | 100 | 45 |
| Traction Performance | 110 | 104 | 107 | 111 | 115 | 100 | 116 |
| Resistance to external damage | 97 | 99 | 98 | 96 | 90 | 100 | 88 |

PNEUMATIC TIRE

CROSS REFERENCE TO RELATED APPLICATIONS

This application claims the benefit of priority of Japanese application no. 2016-174695, filed on Sep. 7, 2016, which is incorporated herein by reference.

BACKGROUND OF THE INVENTION

Field of the Invention

The present invention relates to a pneumatic tire having a plurality of projecting portions which project in a tire width-direction.

Description of the Related Art

There are conventionally known pneumatic tires each having a plurality of projecting portions which project in a tire width-direction (e.g., JP-A-2010-264962). According to a structure of this pneumatic tire, traction performance on a mud area or a rocky area is enhanced due to resistance caused when the projecting portions shear dirt and due to friction between the projecting portions and rock, and resistance to external damage is enhanced due to increase in rubber thickness.

By the way, weight balance of the tire is prone to become uneven due to existence of the projecting portions. Accordingly, when the tire is produced (vulcanized), rubber does not smoothly flow, the tire may be chipped (bare may be generated) with respect to a desired tire shape, or uniformity may be lowered and this may cause vibration or noise of a vehicle.

SUMMARY OF INVENTION

It is an object of the present invention to provide a pneumatic tire capable of suppressing unevenness of weight balance.

There is provided a pneumatic tire, which includes:
a sidewall portion extending in a tire radial-direction; and
a tread portion having a tread surface on an outer side in the tire radial-direction and connected to an outer end of the sidewall portion in the tire radial-direction, wherein
the tread portion includes a plurality of grooves extending to an outer end in a tire width-direction, and a plurality of blocks arranged in a tire circumferential-direction by being defined by the plurality of grooves,
the sidewall portion includes a plurality of projecting portions projecting in the tire width-direction,
the projecting portions are placed such that at least portions of the projecting portions are superposed on one of the plurality of blocks in the tire radial-direction as viewed from the tire width-direction,
at least one of the plurality of projecting portions includes at least one opening, and
a total sum of an opening area of the opening is equal to or smaller than an actual area of the projecting portion in the at least one of the projecting portions.

Also, the pneumatic tire may have a configuration in which:
at least one of the projecting portions is provided with a plurality of openings, and
in at least one of the projecting portions, the openings are placed such that a region of the opening in the tire radial-direction is different from a region of at least another opening in the tire radial-direction.

Also, the pneumatic tire may have a configuration in which:
the opening includes a first side surface placed on a front side in the tire rotation direction, and a second side surface placed on a rear side in the tire rotation direction, and
an angle formed between the second side surface and a surface of the projecting portion is closer to a right angle than an angle formed between the first side surface and the surface of the projecting portion.

Also, the pneumatic tire may have a configuration in which:
the angle formed between the first side surface and the surface of the projecting portion is an obtuse angle.

Also, the pneumatic tire may have a configuration in which: a total sum of the opening area of the opening in at least one of the projecting portions is $3/7$ or lower of the actual area of the projecting portion.

Also, the pneumatic tire may have a configuration in which:
a total sum of the opening area of the opening in at least one of the projecting portions is $1/19$ or higher of the actual area of the projecting portion.

Also, the pneumatic tire may have a configuration in which:
a total sum of the opening area of the opening in at least one of the projecting portions is $1/9$ or higher of the actual area of the projecting portion.

Also, the pneumatic tire may have a configuration in which:
in at least one of the projecting portions, the opening is separated from at least the another opening.

DETAILED DESCRIPTION OF THE PREFERRED EMBODIMENTS

An embodiment of a pneumatic tire will be described below with reference to FIGS. 1 to 7. Size ratios in each of the drawings (including FIGS. 8 to 13) do not always match with actual size ratios, and size ratios between the drawings do not always math with each other.

Figure 1:
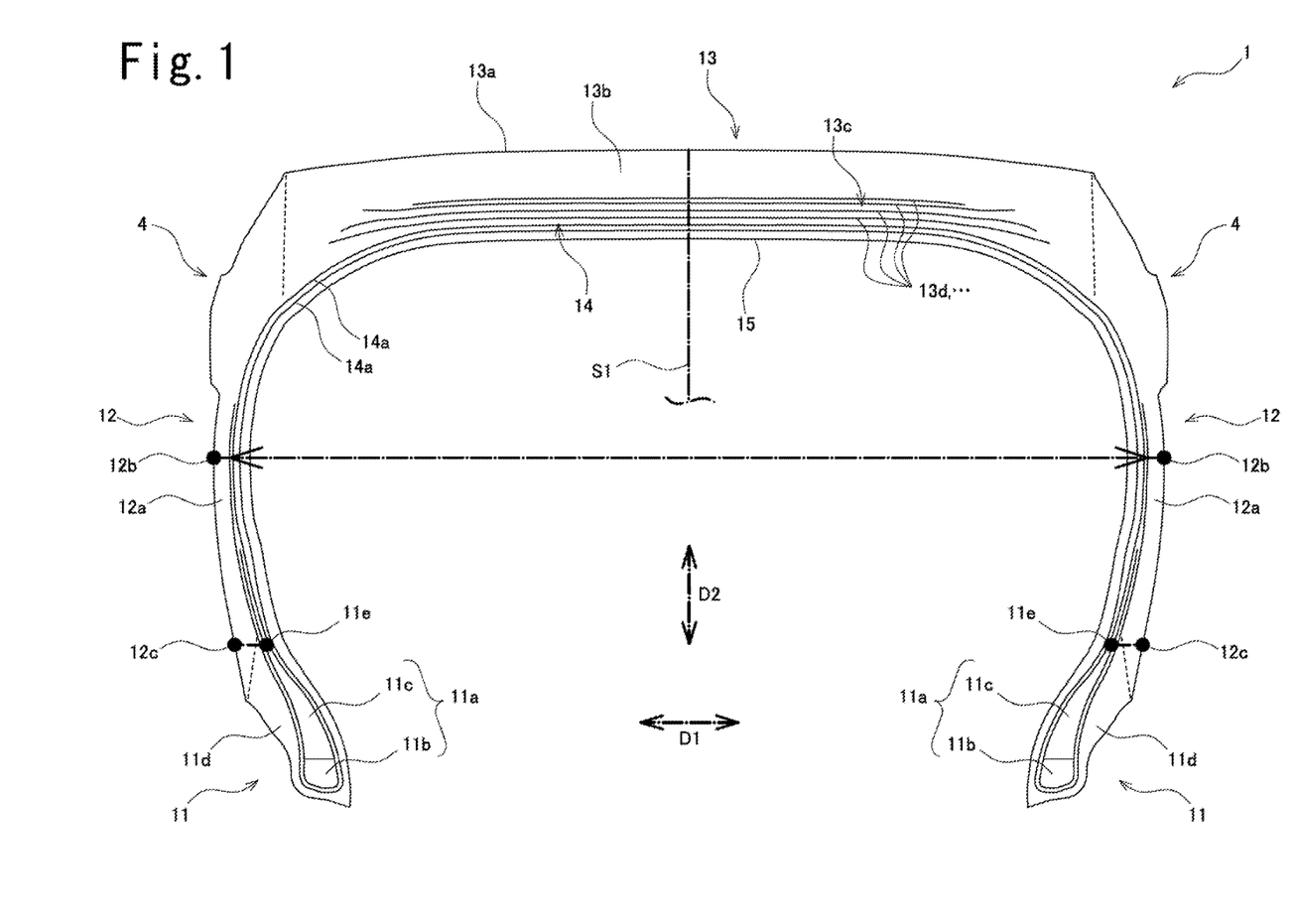
FIG. 1 is a sectional view of essential portions of a tire meridional plane of a pneumatic tire of an embodiment.

As shown in FIG. 1, the pneumatic tire (also called "tire" simply) 1 includes a pair of bead portions 11 having beads 11a. The tire 1 includes sidewall portions 12 extending from the bead portions 11 radially outward in a tire radial-direction D2, and a tread portion 13 which is connected to outer ends of the pair of sidewall portions 12 in the tire-radial direction D2. The tread portion 13 is provided with a tread surface 13a which comes into contact with ground. The tread surface 13a is located on the outer side of in a tire radial-direction D2. The tire 1 is mounted on a rim (not shown).

The tire 1 includes a carcass layer 14 extending between the pair of beads 11a and 11a, and an inner linear 15 located on an inner side of the carcass layer 14 and facing an inner space of the tire 1 into which air is charged. The carcass layer 14 and the inner linear 15 are placed along an inner periphery of the tire over the bead portions 11, the sidewall portions 12 and the tread portion 13.

In FIG. 1 (also in the other drawings), a first direction D1 is a tire width-direction D1 which is parallel to the tire rotation axis, a second direction D2 is the tire radial-direction D2 which is a diameter direction of the tire 1, and a third direction D3 (see FIGS. 2 and 3, for example) is a tire circumferential-direction D3 which is a direction around a tire axial-direction. A tire equator surface S1 is a surface intersecting with the tire rotation axis at right angle, and is located on a center of the tire width-direction D1, and a tire meridional surface is a surface including a surface including the tire rotation axis, and intersecting with the tire equator surface S1.

Each of the beads 11a includes an annularly formed bead core 11b, and a bead filler 11c placed on an outer side of the bead core 11b in the tire radial-direction D2. For example, the bead core 11b is formed by laminating rubber-coated bead wires (metal wires, for example), and the bead filler 11c is formed by forming hard rubber outward of the tire radial-direction D2 in a tapered manner.

Each of the bead portions 11 includes a rim strip rubber 11d placed on an outer side in the tire width-direction D1 than the carcass layer 14 to configure an outer surface which comes into contact with the rim. Each of the sidewall portions 12 includes a sidewall rubber 12a which is placed on an outer side in the tire width-direction D1 than the carcass layer 14 to configure an outer surface.

The tread portion 13 includes a tread rubber 13b. An outer surface of the tread rubber 13b configures the tread surface 13a. The tread portion 13 also includes a belt portion 13c placed between the tread rubber 13b and the carcass layer 14. The belt portion 13c includes a plurality of (four in FIG. 1) belt plies 13d. For example, each of the belt plies 13d includes a plurality of belt cords (organic fiber or metal, for example) which are arranged in parallel, and topping rubbers for coating the belt cords.

The carcass layer 14 is composed of at least one (two in FIG. 1) carcass plies 14a. Each of the carcass plies 14a is folded back around the bead 11a to surround the bead 11a. Each of the carcass plies 14a includes a plurality of ply cords (organic fiber or metal, for example) which are arranged in a direction intersecting with the tire circumferential-direction D3 substantially at right angles, and topping rubbers for coating the ply cords.

To maintain the air pressure, the inner linear 15 has an excellent function to prevent gas from passing through the inner linear 15. In the sidewall portion 12, the inner linear 15 is in intimate contact with an inner periphery of the carcass layer 14, and no other material is interposed between the inner linear 15 and the carcass layer 14.

For example, in a distance between the carcass ply 14a which is placed on the innermost side and a tire inner peripheral surface (inner peripheral surface of inner linear 15), the distance of the sidewall portion 12 is 90% to 180% of the distance of the tread portion 13. More specifically, the distance of the sidewall portion 12 is 120% to 160% of the distance of the tread portion 13.

An outer surface of the sidewall portion 12 has a position 12b which becomes the same, in the tire radial-direction D2, as the tire maximum position (more specifically, maximum distance position of distance of carcass layer 14 between outer sides in tire width-direction D1). The position 12b is called a tire maximum width position 12b, hereinafter.

The outer surface of the sidewall portions 12 has a position 12c which becomes the same, in the tire radial-direction D2, as an outer end 11e of the bead filler 11c in the tire radial-direction D2. The position 12c is called a bead filler outer end position 12c, hereinafter.

Figure 2:
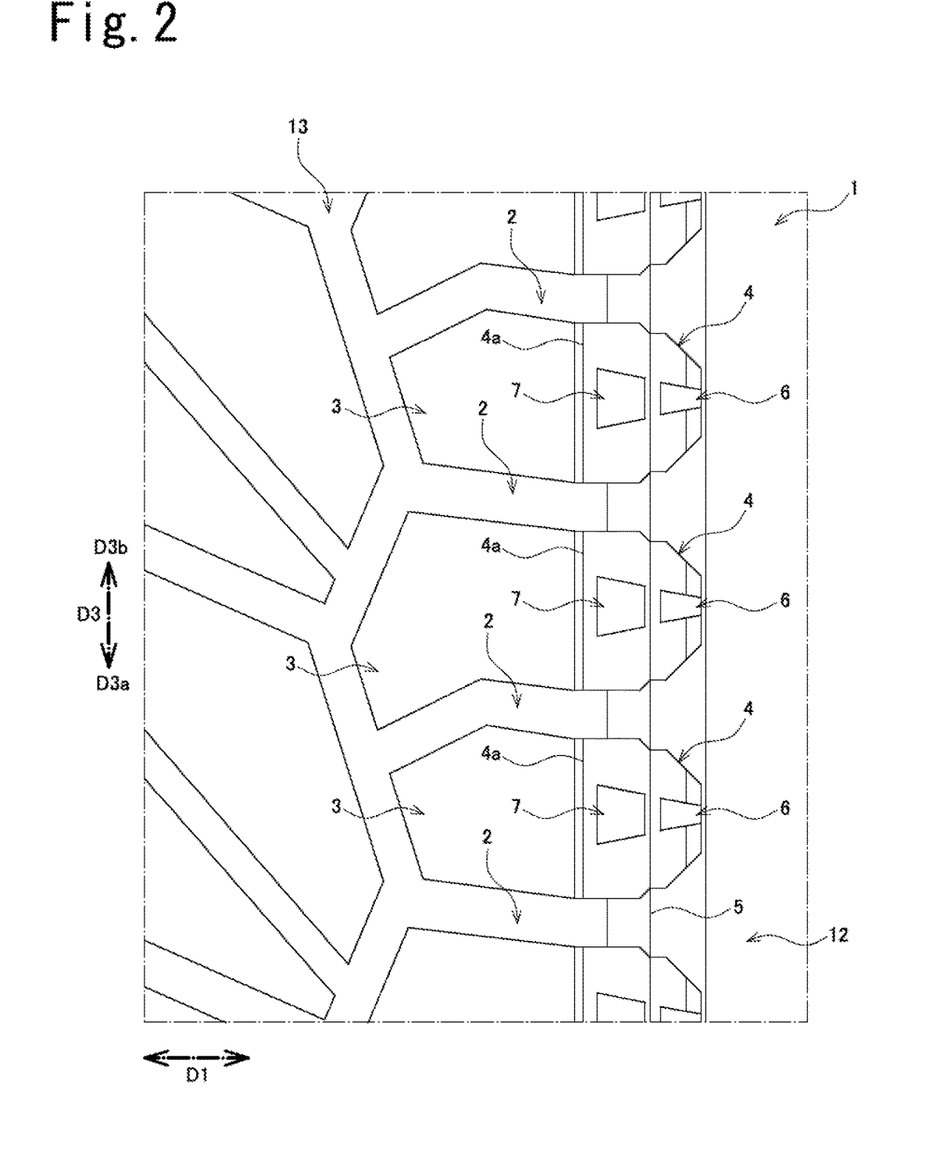
FIG. 2 is a front view (as viewed from tire radial-direction) of the pneumatic tire of the embodiment.
Figure 3:
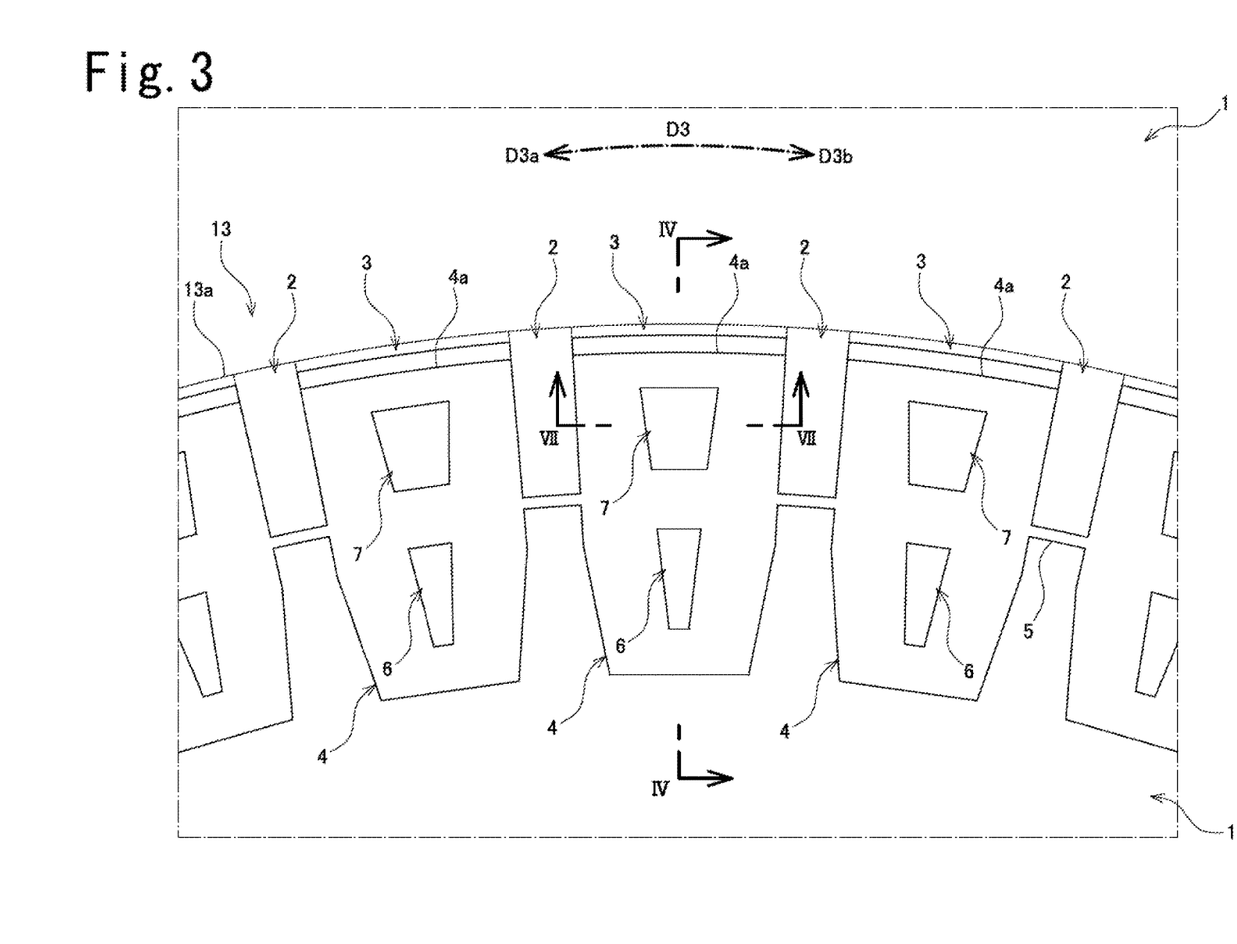
FIG. 3 is a side view (as viewed from tire width-direction) of the pneumatic tire of the embodiment.
Figure 4:
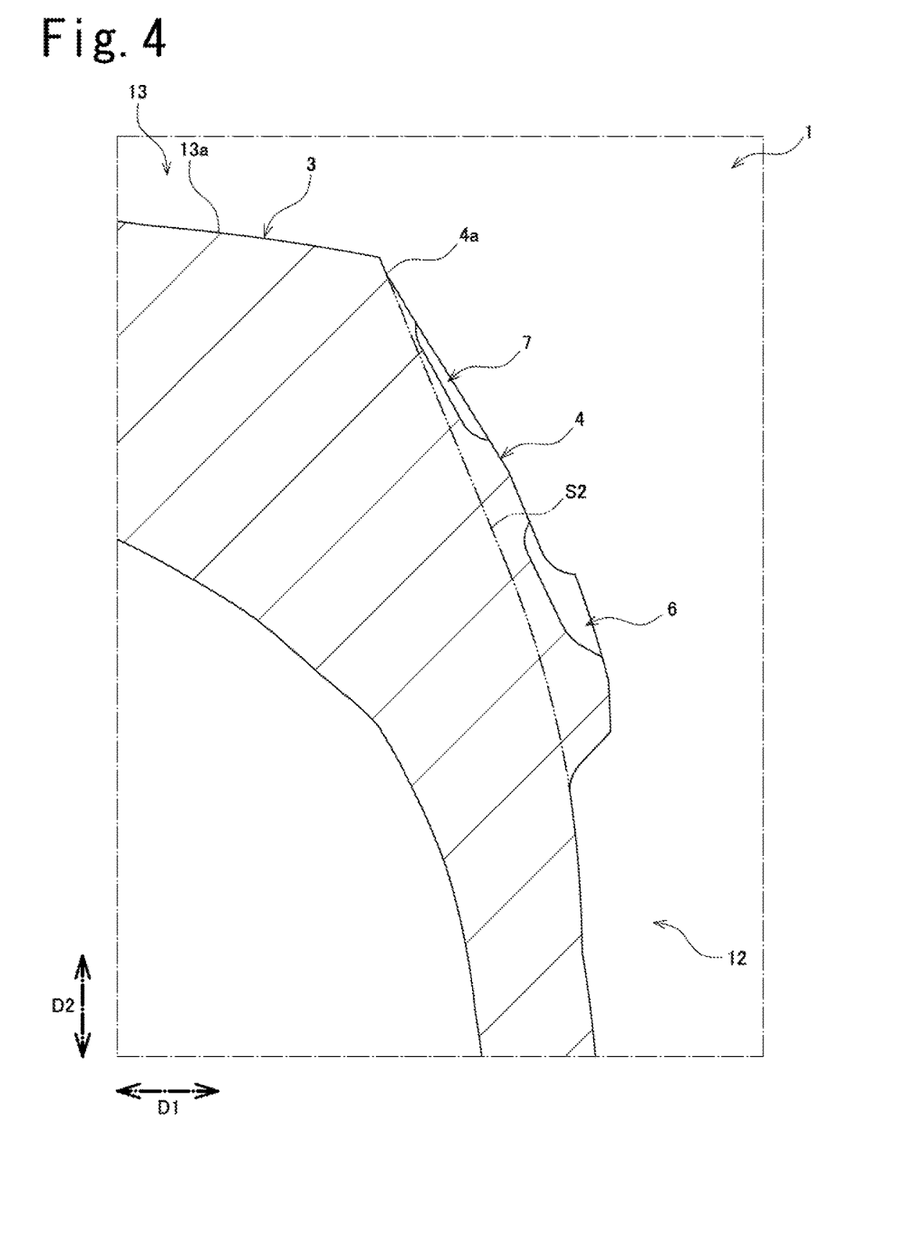
FIG. 4 is an enlarged sectional view of essential portions taken along line IV-IV of FIG. 3.

As shown in FIGS. 2 to 4, the tread portion 13 includes a plurality of grooves 2 extending to the outer end of the tread portion 13 in the tire width-direction D1, and a plurality of blocks 3 which are defined by the plurality of grooves 2, thereby being arranged in the tire circumferential-direction D3. Each of the sidewall portions 12 includes a plurality of projecting portions 4 projecting from a profile surface (reference surface) S2 in the tire width-direction D1, and an annular protrusion portion 5 projecting from the profile surface S2 in the tire width-direction D1, and extending along the tire circumferential-direction D3.

One direction side D3a in the tire circumferential-direction D3 also shows a tire rotation direction when the vehicle runs forward. Therefore, the one direction side D3a in the tire circumferential-direction D3 becomes a front side D3a of the tire rotation direction, and the other direction side D3b becomes a rear side D3b of the tire rotation direction.

The projecting portions 4 are placed at least on the outer side in the tire radial-direction D2 of the sidewall portions 12. According to this, the projecting portions 4 can come into contact with mud and sand in a state where the tire 1 sinks due to a weight of the vehicle in a mud area and a sand area, or can come into contact with the uneven rocks in a rocky area. That is, the projecting portions 4 come into contact with the ground in bad roads such as a mud area, a sand area and a rocky area. The projecting portions 4 do not normally come into contact with the ground in a flat road.

The projecting portions 4 are located on an outer side in the tire radial-direction D2 than a bead filler outer end position 12c (see FIG. 1) of the sidewall portion 12. More specifically, the projecting portions 4 are placed on the outer side in the tire radial-direction D2 than a tire maximum width position 12b (see FIG. 1) of the sidewall portion 12.

The projecting portions 4 are placed such that at least portions of them are superposed at least one of the plurality of blocks 3 in the tire radial-direction D2 as viewed from the tire width-direction D1. That is, the projecting portions 4 are superposed on only one of the blocks 3 in the tire radial-direction D2 as viewed from the tire width-direction D1. For example, the projecting portion 4 is superposed on the block 3 in the tire radial-direction D2 as viewed from the tire width-direction D1 by 25% or more in the tire circumferential-direction D3 (preferably 50% or more, more preferably 75% or more).

An outer end 4a of the projecting portion 4 in the tire radial-direction D2 is located on an inner side in the tire radial-direction D2 than the tread surface 13a of the block 3. According to this, an uneven shape is formed by the tread surface 13a of the block 3 and the outer end 4a of the projecting portion 4 in the tire radial-direction D2.

Since the uneven shape exists, components of the surfaces and the edges are formed. The uneven shape is formed on the portion where the tire comes into contact with the ground such as mud, sand and rock, an area which comes into contact with the ground such as mud, sand and rock is increased, or the surface and the edge formed by the uneven shape easily come into contact with the ground such as mud, sand and rock at various positions. If the uneven shape is formed on the portion where the tire comes into contact with the ground such as mud, sand and rock, the traction performance is enhanced.

Each of the projecting portions 4 includes openings 6 and 7. According to this, a weight of the tire increases due to the existence of the projecting portion 4, and the openings 6 and 7 restrain the weight from increasing. This configuration restrains the weight balance from becoming non-uniform which may be caused by the existence of the projecting portion 4. Due to the existence of the openings 6 and 7, the components of the surfaces and edges are increased and thus, the traction performance is enhanced. The first and second openings 6 and 7 are formed into rectangular shape as viewed from the tire width-direction D1.

The openings 6 and 7 are separated from both end edges of the projecting portion 4 in the tire radial-direction D2. Further, the openings 6 and 7 are separated from the both end edges of the projecting portion 4 in the tire circumferential-direction D3. According to this, since the rigidity of the projecting portion 4 around the openings 6 and 7 can be enhanced, traction performance can be maintained by the projecting portion 4. For example, a width size between the opening edges of the openings 6 and 7 and the end edge of the projecting portion 4 is 1.5 mm or more (preferably, 2.0 mm or more).

The openings 6 and 7 are placed such that they include a center of the projecting portion 4 in the tire circumferential-direction D3. More specifically, central positions of the openings 6 and 7 in the tire circumferential-direction D3 match with the central position of the projecting portion 4 in the tire circumferential-direction D3. The openings 6 and 7 are line-symmetric with respect to center of the projecting portion 4 in the tire circumferential-direction D3. According to this, this configuration restrains the weight balance from becoming non-uniform in the tire circumferential-direction D3, and thus it is possible to restrain the uniformity when the tire is mounted on the vehicle from becoming deteriorated.

Each of the projecting portions 4 includes the two openings 6 and 7. More specifically, the projecting portion 4 includes the first opening 6 placed on the inner side in the tire radial-direction D2 and the second opening 7 placed on the outer side in the tire radial-direction D2. The first opening 6 is placed on the inner side in the tire radial-direction D2 than the annular protrusion portion 5, and the second opening 7 is placed on the outer side in the tire radial-direction D2 than the annular protrusion portion 5.

Region of the tire radial-direction D2 of the first opening 6 (region occupied by the first opening 6 in the tire radial-direction D2) is different from region of the tire radial-direction D2 of the second opening 7 (region occupied by the first opening 7 in the tire radial-direction D2). More specifically, the region of the tire radial-direction D2 of the opening 6 is completely different from the region of the tire radial-direction D2 of the other opening 7. That is, the first openings 6 are separated from the second openings 7 in the tire radial-direction D2.

According to this, the second opening 7 exhibits traction performance in a shallow mud area, and the first and second openings 6 and 7 exhibit traction performance in a deep mud area. The first opening 6 exhibits traction performance in a high rocky area, and, the second opening 7 exhibits the traction performance in a low rocky area. In this manner, the tire 1 can be applied to mud areas of various depths and to rocky areas of various heights.

Figure 5:
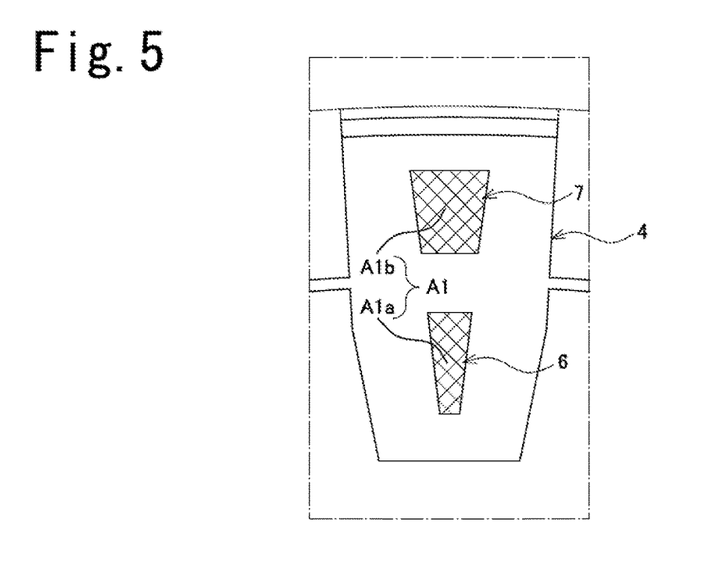
FIG. 5 is a diagram showing a region of an opening area of an opening of the embodiment.
Figure 6:
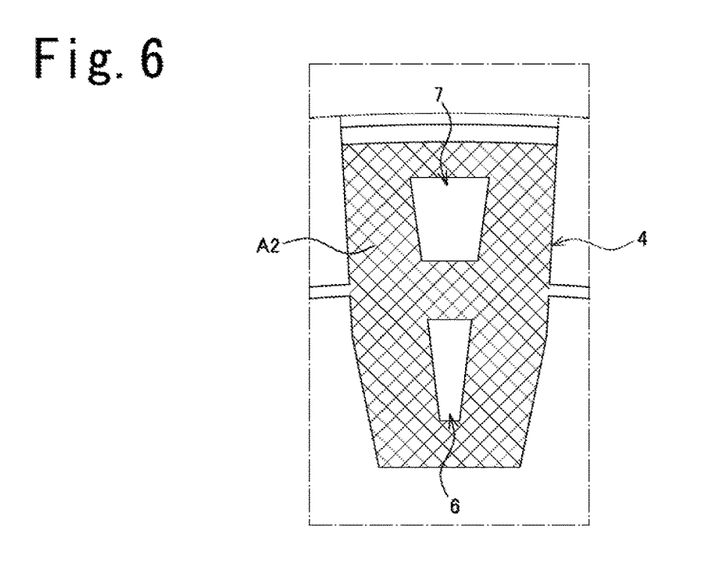
FIG. 6 is a diagram showing a region of an actual surface area of a projecting portion of the embodiment.

As shown in FIGS. 5 and 6, in the projecting portion 4 having the openings 6 and 7, a total sum A1 of opening areas (meshed region in FIG. 5) A1a and A1b is equal to or smaller than an actual area A2 (meshed region in FIG. 6) of the projecting portion 4. According to this, it is possible to restrain the resistance to external damage from being reduced because rubber thickness is reduced by the openings 6 and 7. The actual area A2 of the projecting portion 4 is an area obtained by subtracting the opening areas A1a and A1b from the apparent surface area (area including opening areas A1a and A1b) surrounded by the end edge of the projecting portion 4.

To restrain the reduction of resistance to external damage caused by existence of the openings 6 and 7, it is preferable that the total sum A1 of the opening areas A1a and A1b of the openings 6 and 7 is 3/7 or less of the actual area A2 of the projecting portion 4. That is, it is preferable that the total sum A1 of the opening areas A1a and A1b of the openings 6 and 7 is 30% or lower of the apparent surface area of the projecting portion 4.

To enhance the traction performance by the existence of the openings 6 and 7, it is preferable that the total sum A1 of the opening areas A1a and A1b of the openings 6 and 7 is 1/19 or higher of the actual area A2 of the projecting portion 4, and more preferably 1/9 or higher. That is, the total sum A1 of the opening areas A1a and A1b of the openings 6 and 7 is 5% or higher of the apparent surface area of the projecting portion 4, and more preferably 10% or higher.

In this embodiment, the total sum A1 of the opening areas A1a and A1b of the openings 6 and 7 is 1/3 of the actual area A2 of the projecting portion 4. That is, in this embodiment, the total sum A1 of the opening areas A1a and A1b of the openings 6 and 7 is 25% of the apparent surface area of the projecting portion 4.

Figure 7:
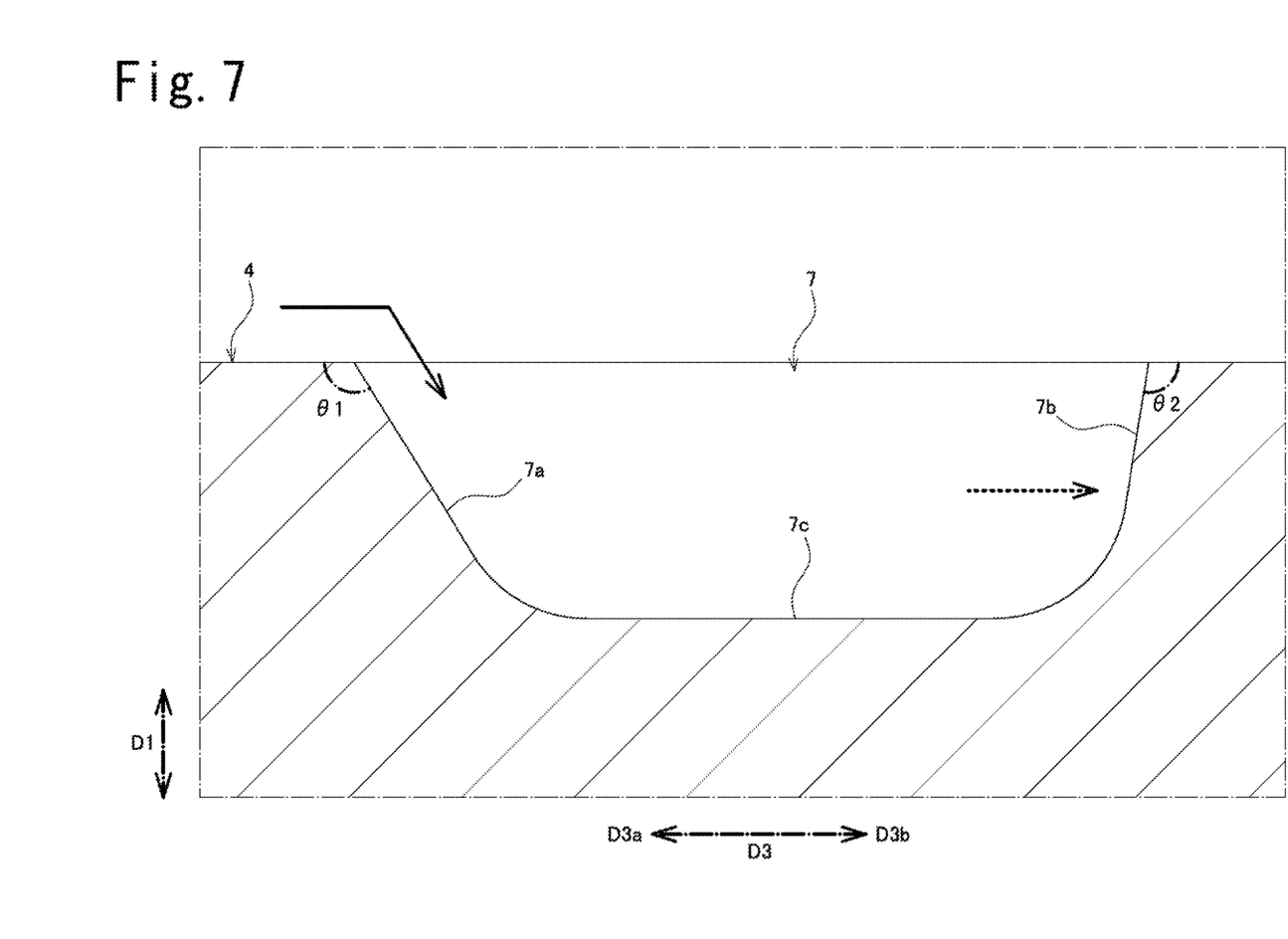
FIG. 7 is an enlarged sectional view of essential portions taken along line VII-VII of FIG. 3.

As shown in FIG. 7, the second opening 7 includes a first side surface 7a placed on the front side D3a of the tire rotation direction, a second side surface 7b placed on the rear side D3b of the tire rotation direction, and a bottom surface 7c which connects the first side surface 7a and the second side surface 7b with each other. Although it is not illustrated in the drawings, the first opening 6 also has the same configuration as the second opening 7.

A first angle θ1 formed between the first side surface 7a and the surface of the projecting portion 4 is an obtuse angle. According to this, mud easily enters the second opening 7 as shown by a solid arrow. A second angle θ2 formed between the second side surface 7b and the surface of the projecting portion 4 is close to the right angle. According to, mud collides against the second side surface 7b substantially vertically as shown by a broken arrow, resistance when the second side surface 7b shears mud becomes great.

Since the first side surface 7a and the second side surface 7b corporate with each other in this manner, traction performance can be enhanced in a mud area. In this embodiment, the second angle θ2 is an obtuse angle and is smaller than the first angle θ1.

As described above, the pneumatic tire 1 of the embodiment include a sidewall portion 12 extending in a tire radial-direction D2, and a tread portion 13 having a tread surface 13a on an outer side in the tire radial-direction D2 and connected to an outer end of the sidewall portion 12 in the tire radial-direction D2. The tread portion 13 includes a plurality of grooves 2 extending to an outer end in a tire width-direction D1, and a plurality of blocks 3 arranged in a tire circumferential-direction D3 by being defined by the plurality of grooves 2. The sidewall portion 12 includes a plurality of projecting portions 4 projecting in the tire width-direction D1. The projecting portions 4 are placed such that at least portions of the projecting portions 4 are superposed on one of the plurality of blocks 3 in the tire radial-direction D2 as viewed from the tire width-direction D1. At least one of the plurality of projecting portions 4 includes at least one openings 6 and 7. A total sum A1 of an opening areas A1a and A1b of the openings 6 and 7 is equal to or smaller than an actual area A2 of the projecting portion 4 in the at least one of the projecting portions 4.

According to the above-described configuration, the projecting portion 4 is placed such that at least portion of the projecting portion 4 is superposed on at least one of the plurality of blocks 3 in the tire radial-direction D2 as viewed from the tire width-direction D1. Therefore, traction performance is exhibited by a positional relation (e.g., uneven shape) between the block 3 and the projecting portion 4 in the tire width-direction D1.

Due to the existence of the projecting portions 4, a rubber weight of this portion is increased. Hence, at least one of the plurality of projecting portions 4 includes the openings 6 and 7. According to this, it is possible to restrain the unevenness of the weight balance which may be caused by the existence of the projecting portions 4. Further, the traction performance is exhibited by the surfaces and the edges of the openings 6 and 7.

In at least one of the projecting portions 4, the total sum A1 of the opening areas A1a and A1b of the openings 6 and 7 is equal to or smaller than the actual area A2 of the projecting portion 4. According to this, it is possible to restrain the reduction of resistance to external damage caused by existence of the openings 6 and 7.

In the pneumatic tire 1 of the embodiment, least one of the projecting portions is 4 provided with a plurality of openings 6 and 7. In at least one of the projecting portions 4, the openings 6 and 7 are placed such that a region of the opening 6 in the tire radial-direction D2 is different from a region of at least another opening 7 in the tire radial-direction D2.

According to the above-described configuration, the region of the predetermined opening 6 in the tire radial-direction D2 is different from the region of at least another opening 7 in the tire radial-direction D2. According to this, it is possible to exhibit traction performance by the surfaces and edges of the openings 6 and 7 with respect to mud area of the various depths and to rocky areas of various heights.

In the pneumatic tire 1 of the embodiment, the openings 6 and 7 include a first side surface 7a placed on a front side D3a in the tire rotation direction, and a second side surface 7b placed on a rear side D3b in the tire rotation direction. And an angle θ2 formed between the second side surface 7b and a surface of the projecting portion 4 is closer to a right angle than an angle θ1 formed between the first side surface 7a and the surface of the projecting portion 4.

According to the above-described configuration, the second angle θ2 formed between the second side surface 7b and the surface of the projecting portion 4 is close to the right angle than the angle θ1 formed between the first side surface 7a and the surface of the projecting portion 4. Therefore, resistance when the second side surface 7b shears mud becomes great. According to this, it is possible to efficiently enhance the traction performance in the mud area.

In the pneumatic tire 1 of the embodiment, the angle θ1 formed between the first side surface 7a and the surface of the projecting portion 4 is an obtuse angle.

According to the above-described configuration, the angle θ1 formed between the first side surface 7a and the surface of the projecting portion 4 is obtuse angle. Hence, mud easily enters the openings 6 and 7. According to this, since shearing of mud in the second side surface 7b is prone to be generated, it is possible to further efficiently enhance the traction performance in the mud area.

The pneumatic tire is not limited to the configuration of the embodiment described above, and the effects are not limited to those described above. It goes without saying that the pneumatic tire can be variously modified without departing from the scope of the subject matter of the present invention. For example, the constituents, methods, and the like of various modified examples described below may be arbitrarily selected and employed as the constituents, methods, and the like of the embodiments described above, as a matter of course.

In the pneumatic tire 1 of the embodiments, the region of the opening 6 in the tire radial-direction D2 is completely different from the region of the other opening 7 in the tire radial-direction D2. However, the pneumatic tire is not limited to this configuration. As shown in FIGS. 8 to 11 for example, at least a portion of the region of the predetermined opening 8 in the tire radial-direction D2 is superposed on a region of at least other opening 8 in the tire radial-direction D2. Alternatively, for example, the region of the opening in the tire radial-direction D2 may be completely the same as regions of all of the other openings in the tire radial-direction D2.

In the pneumatic tire 1 of the embodiments, the second angle θ2 formed between the second side surface 7b and the surface of the projecting portion 4 is closer to a right angle than the first angle θ1 formed between the first side surface 7a and the surface of the projecting portion 4. However, the pneumatic tire is not limited to this configuration. For example, the first angle θ1 may be closer to a right angle than the second angle θ2. Alternatively, for example, the first angle θ1 may be the same as the second angle θ2.

In the pneumatic tire 1 of the embodiments, the first angle θ1 formed between the first side surface 7a and the surface of the projecting portion 4 is an obtuse angle. However, the pneumatic tire is not limited to this configuration. For example, the first angle θ1 may be a right angle, or the first angle θ1 may be the acute angle.

In the pneumatic tire 1 of the embodiments, the openings 6 and 7 are line-symmetric with respect to a center of the projecting portion 4 in the tire circumferential-direction D3. However, the pneumatic tire is not limited to this configuration. As shown FIGS. 9, 10 and 12 for example, the openings 8 may be asymmetric with respect to center of the projecting portion 4 in the tire circumferential-direction D3.

Figure 10:
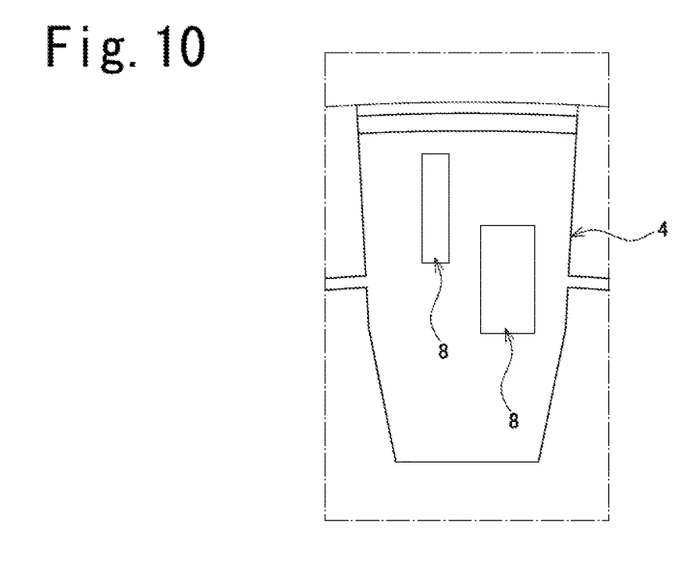
FIG. 10 is a diagram showing a projecting portion of another embodiment.

In the pneumatic tire 1 of the embodiments, the openings 6 and 7 are placed such that they include the center of the projecting portion 4 in the tire circumferential-direction D3. However, the pneumatic tire is not limited to this configuration. As shown in FIG. 10 for example, openings 8 may be separated from the center of the projecting portion 4 in the tire circumferential-direction D3.

In the pneumatic tire 1 of the embodiment, the opening areas A1a and A1b of the openings 6 and 7 are the same on the front side D3a and the rear side D3b of the tire rotation direction with respect to the center of the projecting portion 4 in the tire circumferential-direction D3. However, the pneumatic tire is not limited to this configuration. As shown in FIG. 10 for example, opening areas of the openings 8 may be different from each other on the front side D3a and the rear side D3b of the tire rotation direction with respect to the center of the projecting portion 4 in the tire circumferential-direction D3.

Figure 11:
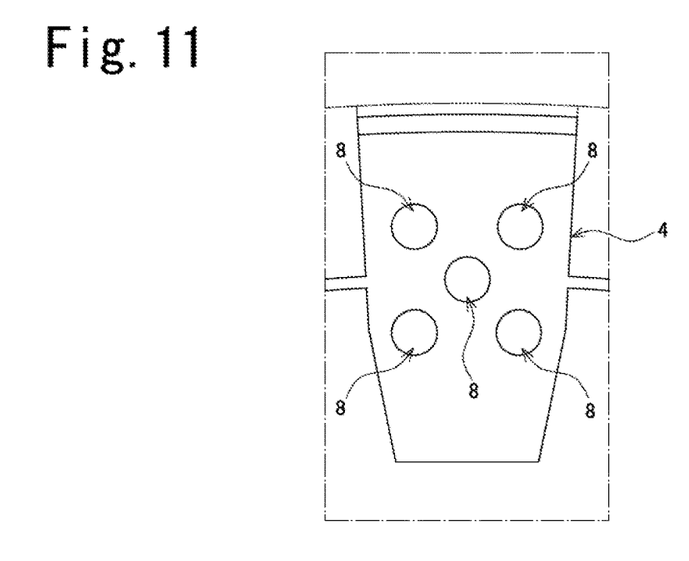
FIG. 11 is a diagram showing a projecting portion of another embodiment.
Figure 12:
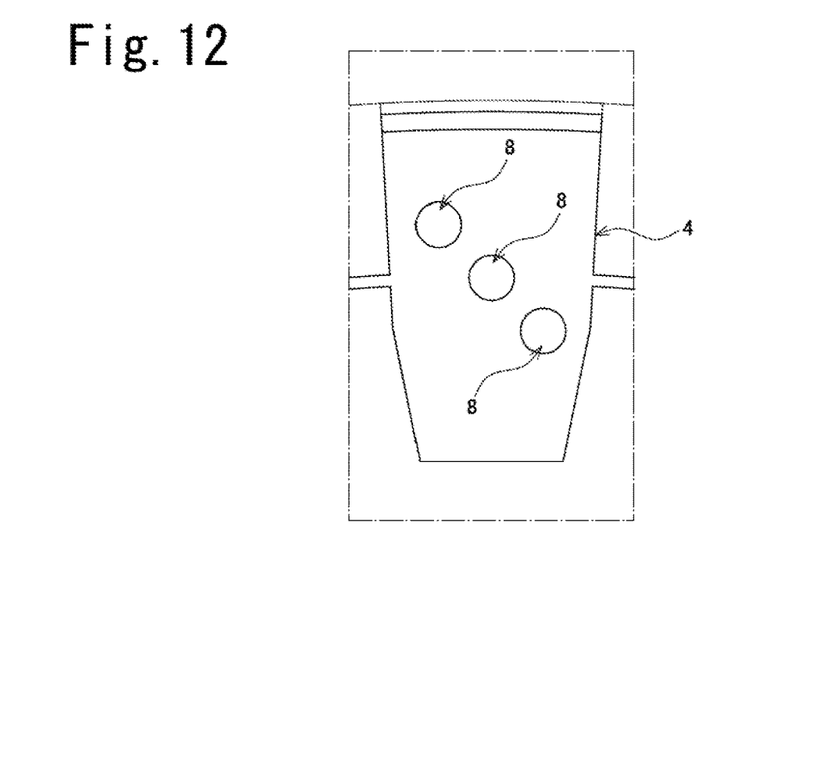
FIG. 12 is a diagram showing a projecting portion of another embodiment.
Figure 13:
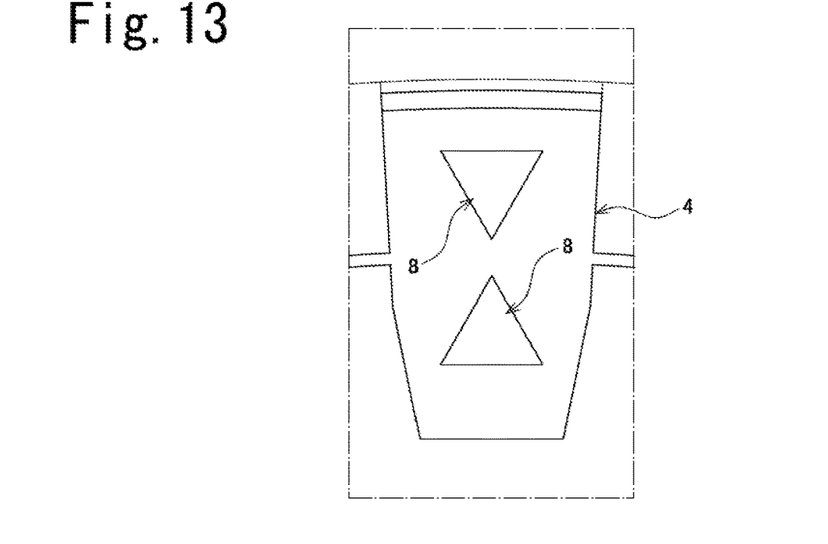
FIG. 13 is a diagram showing a projecting portion of another embodiment.

In the pneumatic tire 1 of the embodiments, the openings 6 and 7 are formed into rectangular shapes as viewed from the tire width-direction D1. However, the pneumatic tire is not limited to this configuration. As shown in FIGS. 11 and 12 for example, the openings 8 may be formed into a circular (perfect circular, elliptic) shape as viewed from the tire width-direction D1. Further, as shown in FIG. 13 for example, the openings 8 may be formed into a triangular shape as viewed from the tire width-direction D1. The opening 8 may be formed into a polygonal shape having five angle portions or more as viewed from the tire width-direction D1.

Figure 8:
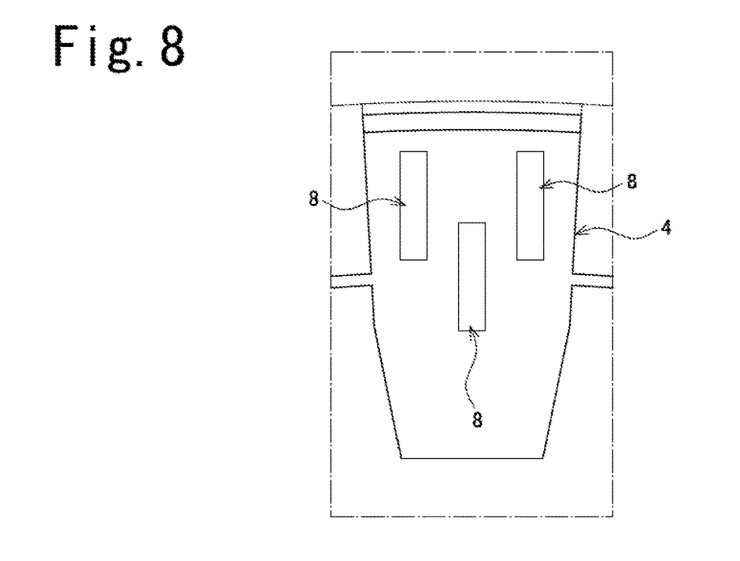
FIG. 8 is a diagram showing a projecting portion of another embodiment.
Figure 9:
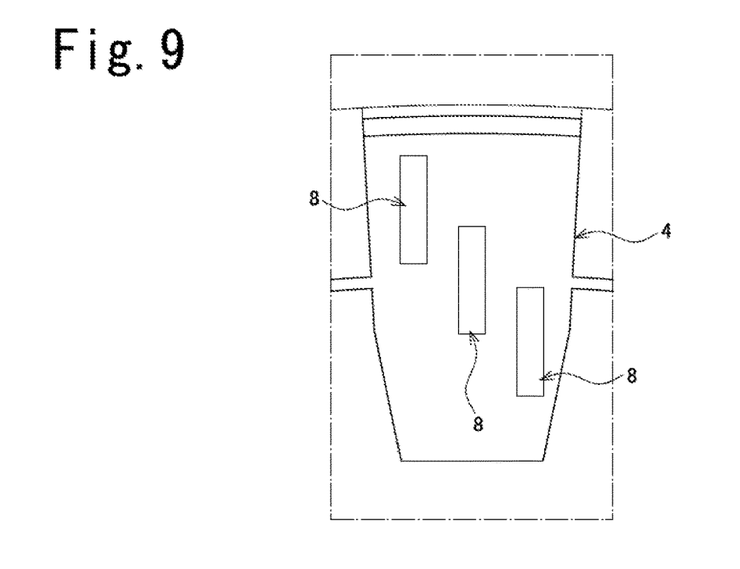
FIG. 9 is a diagram showing a projecting portion of another embodiment.

In the pneumatic tire 1 of the embodiments, two openings 6 and 7 may be provided in one projecting portion 4. However, the pneumatic tire is not limited to this configuration. For example, one or three or more openings may be provided in one projecting portion 4. As shown in FIGS. 8, 9 and 12 for example, three openings 8 may be provided in one projecting portion 4. As shown in FIG. 11 for example, five openings 8 may be provided in one projecting portion 4.

In the pneumatic tire 1 of the embodiments, the openings 6 and 7 are provided in all of the projecting portions 4. However, the pneumatic tire is not limited to this configuration. For example, it is only necessary that the openings 6 and 7 are provided at least in one of the plurality of projecting portions 4. It is preferable that the openings 6 and 7 are provided at least in ¼ of the plurality of projecting portions 4, it is more preferable that the openings 6 and 7 are provided at least in ⅓, and it is more preferable that the openings 6 and 7 are provided at least in ½.

In the pneumatic tire 1 of the embodiments, all of the projecting portions 4 have the same shapes, and all of the openings 6 and 7 have the same shape. However, the pneumatic tire is not limited to this configuration. The projecting portions 4 may have different shapes, and they may be placed in series in the tire circumferential-direction D3. Further, the openings 6 and 7 may have a plurality of different shapes, and may be placed in the respective projecting portions 4 in series in the tire circumferential-direction D3.

In the pneumatic tire 1 of the embodiments, the openings 6 and 7 are respectively separated from both end edges of the projecting portion 4 in the tire radial-direction D2. However, the pneumatic tire is not limited to this configuration. The openings 6 and 7 may be separated only from one of the end edges of the projecting portion 4 in the tire radial-direction D2.

In the pneumatic tire 1 of the embodiments, the openings 6 and 7 are respectively separated from both end edges of the projecting portion 4 in the tire circumferential-direction D3. However, the pneumatic tire is not limited to this configuration. The openings 6 and 7 may be separated only from one of the end edges of the projecting portion 4 in the tire circumferential-direction D3.

In the pneumatic tire 1 of the embodiments, the projecting portions 4 are provided on both of the pair of sidewall portions 12. However, the pneumatic tire is not limited to this configuration. For example, the projecting portions 4 may be provided on one of the pair of sidewall portions 12. For example, the projecting portions 4 may be provided on at least one of the pair of sidewall portions 12 which is placed on the outer side when the tire is mounted on the vehicle.

The pneumatic tire 1 may employ such as configuration that the projecting portions 4 are provided on both of the pair of sidewall portions 12 but the openings 6 and 7 are provided on one of or both of the sidewall portions 12. For example, the openings 6 and 7 may be provided on one of the pair of sidewall portions 12 which is placed on the outer side when the tire is mounted on the vehicle.

EXAMPLE

To specifically show the configuration and effect of the tire, Examples and Comparative Examples will be described below with reference to FIG. 14.

<Traction Performance>

Tires having sizes of P265/70R17 were mounted on a vehicle F150, the tires were soaked in a mud pool having depth of 5 cm and length of 10 m, the tires were once stopped, and time elapsed until the tires were escaped from the mud pool was measured. Results of Comparative Example 1 are evaluated as 100 as indices. The higher the indices are (time elapsed until tires were escaped from the mud pool is shorter), the more excellent the traction performance is.

<Resistance to External Damage>

Tires having sizes of P265/70R17 were mounted on a vehicle F150, the tires were made to collide against a curb five times in a state where the vehicle runs at 10 km/Hr, and a chipped amount at that time was measured. Results of Comparative Example 1 are evaluated as 100 as indices. The higher the indices are (as chipped amount is smaller) the more excellent the resistant to external damage is.

Examples 1 to 5

Example 1 is a tire of the embodiment according to FIGS. 1 to 7. That is, the total sum A1 of the opening areas of the openings in Example 1 is ⅓ (=25/75) of the actual area A2 of the projecting portion.

Example 2 is a tire in which total sum A1 of the opening areas of the openings in Example 1 is changed to 1/19 (=5/95) of the actual area A2 of the projecting portion.

Example 3 is a tire in which total sum A1 of the opening areas of the openings in Example 1 is changed to ⅑ (=10/90) of the actual area A2 of the projecting portion.

Example 4 is a tire in which total sum A1 of the opening areas of the openings in Example 1 is changed to 3/7 (=30/70) of the actual area A2 of the projecting portion.

Example 5 is a tire in which total sum A1 of the opening areas of the openings in Example 1 is changed to 1 (=50/50) of the actual area A2 of the projecting portion.

Comparative Examples 1 to 2

Comparative Example 1 is a tire in which the tire of the Example 1 is changed to a configuration having no openings.

Comparative Example 2 is a tire in which total sum A1 of the opening areas of the openings in Example 1 is changed to 11/9 (=55/45) of the actual area A2 of the projecting portion. That is, the total sum of the opening areas of the openings is greater than the actual area A2 of the projecting portion.

<Result of Evaluation>

Figure 14:
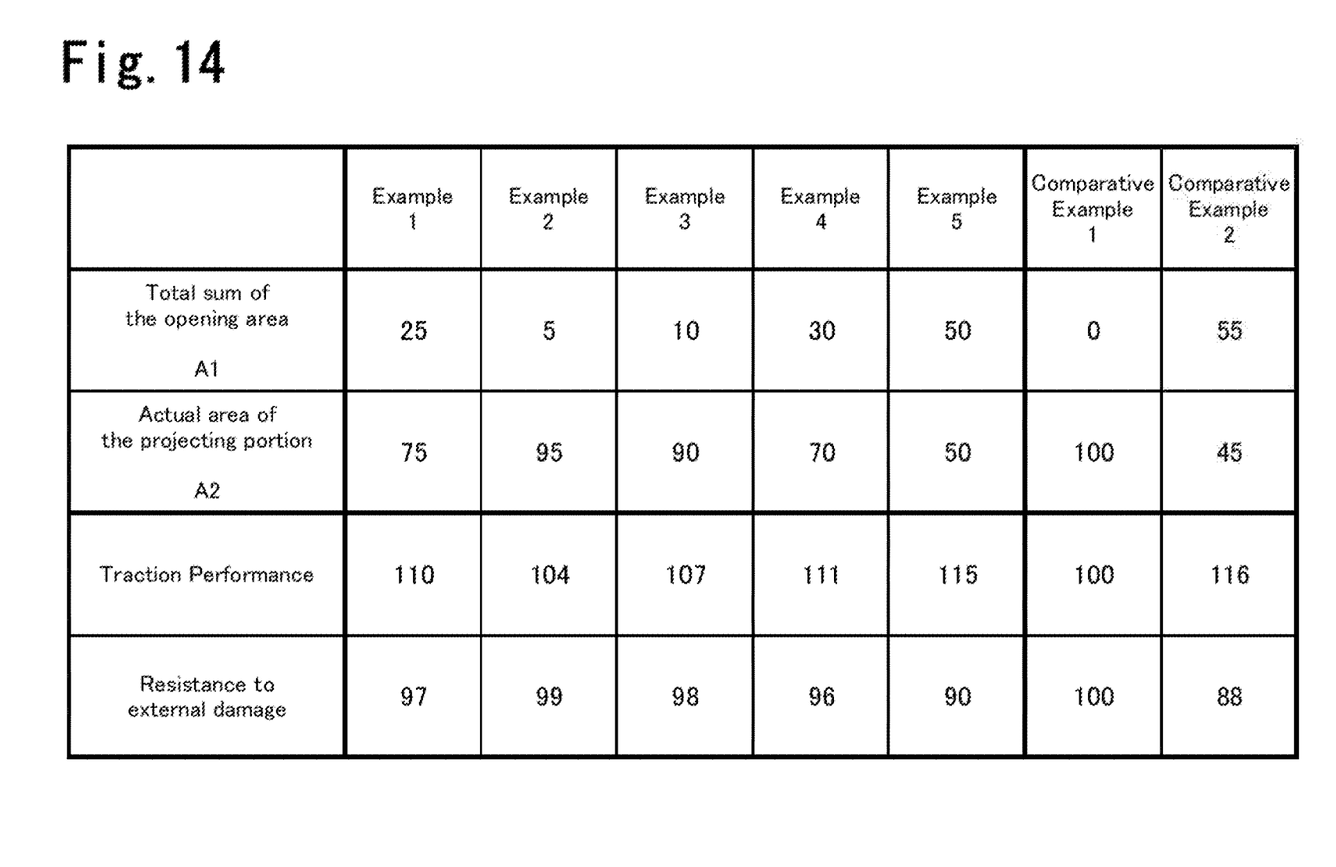
FIG. 14 is an evaluation table between examples and comparative examples.

As shown in FIG. 14, in Comparative Example 2, as compared with Comparative Example 1, traction performance could be enhanced and reduction of resistance to external damage was 10% or higher and reduction of resistance to external damage was extremely high. In Examples 1 to 5, as compared with Comparative Example 1, traction performance could be enhanced, and reduction of resistance to external damage was 10% or lower.

Therefore, in Examples 1 to 5, traction performance could be enhanced, and reduction of the resistance to external damage could be restrained. By employing the configuration that at least one of the projecting portions includes at least one opening, and the total sum A1 of the opening areas of the openings is equal to or smaller than the actual area A2 of the projecting portion, it is possible to enhance the traction performance, and to restrain the reduction of the resistance to external damage.

More preferable Examples of the tire will be described below.

In Example 2, as compared with Comparative Example 1, reduction of resistance to external damage is 5% or lower (1%), and enhancement of the traction performance is lower than 5%. In Example 5, as compared with Comparative Example 1, enhancement of traction performance is 5% or higher (15%) and reduction of resistance to external damage is 5% or higher.

In Examples 1, 3 and 4, as compared with Comparative Example 1, enhancement of traction performance is 5% or higher and reduction of resistance to external damage is 5% or lower, and balance of these abilities is excellent. Since it is possible to efficiently enhance the traction performance and restrain the reduction of the resistance to external damage in this manner, the configuration that the total sum A1 of the opening areas of the openings is $1/9$ (=10/90) or higher of the actual area A2 of the projecting portion and the total sum A1 of the opening areas of the openings is $3/7$ (=30/70) or lower of the actual area A2 of the projecting portion is preferable.

What is claimed is:

1. A pneumatic tire comprising:
   a sidewall portion extending in a tire radial-direction; and
   a tread portion having a tread surface on an outer side in the tire radial-direction and connected to an outer end of the sidewall portion in the tire radial-direction, wherein
   the tread portion includes a plurality of grooves extending to an outer end in a tire width-direction, and a plurality of blocks arranged in a tire circumferential-direction by being defined by the plurality of grooves,
   the sidewall portion includes a plurality of projecting portions projecting in the tire width-direction,
   the projecting portions are placed such that at least portions of the projecting portions are superposed on one of the plurality of blocks in the tire radial-direction as viewed from the tire width-direction,
   at least one of the plurality of projecting portions includes at least one opening, and
   a total sum of an opening area of the opening is equal to or smaller than an actual area of the projecting portion in the at least one of the projecting portions,
   the at least one opening includes a first side surface placed on a first side in a tire circumferential-direction, and a second side surface placed on a second side opposite the first side in the tire circumferential-direction, and
   an angle formed between the second side surface and a surface of the projecting portion is closer to a right angle than an angle formed between the first side surface and the surface of the projecting portion.

2. The pneumatic tire according to claim 1, wherein at least one of the projecting portions is provided with a plurality of openings, and
   in at least one of the projecting portions, the openings are placed such that a region of the opening in the tire radial-direction is different from a region of at least another opening in the tire radial-direction.

3. The pneumatic tire according to claim 2, wherein
   a total sum of the opening area of the opening in at least one of the projecting portions is $3/7$ or lower of the actual area of the projecting portion, and
   a total sum of the opening area of the opening in at least one of the projecting portions is $1/19$ or higher of the actual area of the projecting portion.

4. The pneumatic tire according to claim 3, wherein a total sum of the opening area of the opening in at least one of the projecting portions is $1/9$ or higher of the actual area of the projecting portion.

5. The pneumatic tire according to claim 2, wherein in at least one of the projecting portions, the opening is separated from at least the another opening.

6. The pneumatic tire according to claim 1, wherein the angle formed between the first side surface and the surface of the projecting portion is an obtuse angle.

7. The pneumatic tire according to claim 1, wherein at least one of the projecting portions is provided with a plurality of openings,
   a total sum of the opening area of the opening in at least one of the projecting portions is $3/7$ or lower of the actual area of the projecting portion, and
   a total sum of the opening area of the opening in at least one of the projecting portions is $1/19$ or higher of the actual area of the projecting portion.

8. The pneumatic tire according to claim 1, wherein positioned between each adjacent projection portion of the plurality of projecting portions is an annular protrusion portion, the annular protrusion portion extending along the tire circumferential-direction, and
   the at least one opening includes a first opening positioned on a more inner side in the tire radial-direction than the annular protrusion portion, and a second opening positioned on a more outer side in the tire radial-direction than the annular protrusion portion.

9. The pneumatic tire according to claim 1, wherein at least one of the projecting portions is provided with first and second openings, and
   at least a portion of the first opening in the tire radial-direction is superposed on a region of the second opening in the tire radial-direction.

10. The pneumatic tire according to claim 1, wherein the at least one opening is asymmetric with respect to a center of the at least one projecting portion in the tire circumferential-direction.

11. The pneumatic tire according to claim 1, wherein the at least one opening is separated from a center of the at least one projecting portion in the tire circumferential-direction.

12. The pneumatic tire according to claim 1, wherein the opening area of the at least one opening is different from each other on the first side and the second side of the tire circumferential-direction with respect to a center of the projecting portion in the tire circumferential-direction.

13. A pneumatic tire comprising:
a sidewall portion extending in a tire radial-direction; and
a tread portion having a tread surface on an outer side in the tire radial-direction and connected to an outer end of the sidewall portion in the tire radial-direction, wherein
the tread portion includes a plurality of grooves extending to an outer end in a tire width-direction, and a plurality of blocks arranged in a tire circumferential-direction by being defined by the plurality of grooves,
the sidewall portion includes a plurality of projecting portions projecting in the tire width-direction,
the projecting portions are placed such that at least portions of the projecting portions are superposed on one of the plurality of blocks in the tire radial-direction as viewed from the tire width-direction,
at least one of the plurality of projecting portions includes a plurality of openings, and
a total sum of an opening area of the openings is $3/7$ or lower and $1/19$ or higher of an actual area of the projecting portion in the at least one of the projecting portions.

14. The pneumatic tire according to claim 13, wherein in at least one of the projecting portions, the openings are placed such that a region of the opening in the tire radial-direction is different from a region of at least another opening in the tire radial-direction.

15. The pneumatic tire according to claim 13, wherein positioned between each adjacent projection portion of the plurality of projecting portions is an annular protrusion portion, the annular protrusion portion extending along the tire circumferential-direction, and
the at least one opening includes a first opening positioned on a more inner side in the tire radial-direction than the annular protrusion portion, and a second opening positioned on a more outer side in the tire radial-direction than the annular protrusion portion.

16. The pneumatic tire according to claim 13, wherein at least one of the projecting portions is provided with first and second openings, and
at least a portion of the first opening in the tire radial-direction is superposed on a region of the second opening in the tire radial-direction.

17. The pneumatic tire according to claim 13, wherein the at least one opening is asymmetric with respect to a center of the at least one projecting portion in the tire circumferential-direction.

18. The pneumatic tire according to claim 13, wherein the at least one opening is separated from a center of the at least one projecting portion in the tire circumferential-direction.

19. The pneumatic tire according to claim 13, wherein the opening area of the at least one opening is different from each other on the first side and the second side of the tire circumferential-direction with respect to a center of the projecting portion in the tire circumferential-direction.

* * * * *